United States Patent [19]

Millican

[11] Patent Number: 4,768,799
[45] Date of Patent: Sep. 6, 1988

[54] MOTORCYCLE FOOTGUARD

[76] Inventor: Edwin E. Millican, 213 Reeves Ct., Euless, Tex. 76040

[21] Appl. No.: 943,308

[22] Filed: Dec. 16, 1986

[51] Int. Cl.$^4$ ............................................. B62D 25/00
[52] U.S. Cl. ..................................... 280/291; 180/215
[58] Field of Search ................ 280/291, 165; 180/215, 180/216, 217; 296/75

[56] References Cited

U.S. PATENT DOCUMENTS

| | | | |
|---|---|---|---|
| 1,394,883 | 10/1921 | Bernard | 280/165 |
| 2,158,170 | 5/1939 | Anderson | 280/291 |
| 4,451,057 | 5/1984 | Lawson | 280/291 |

FOREIGN PATENT DOCUMENTS 439790  5/1927  Fed. Rep. of Germany ........ 280/91

OTHER PUBLICATIONS

FOURTRAX 70, American Honda Motor Co., Inc., (Advertising Brochure), 10/85.

Primary Examiner—John A. Pekar
Attorney, Agent, or Firm—James E. Bradley

[57] ABSTRACT

A three-wheeled or four-wheeled motorcycle having a body, two rear wheels, a pedal on each side of the body for a rider's feet, and a footguard on each pedal. Each footguard has a frame and a flat, horizontal plate, attached to the frame. A vertical member, extending upward from the rear edge of the plate, prevents the rider's foot from moving off of the plate toward the rear wheel. An elongated guard member extends rearward and outward from the frame, to additionally keep the rider's foot away from the rear wheel.

4 Claims, 2 Drawing Sheets

MOTORCYCLE FOOTGUARD

BACKGROUND OF THE INVENTION

1. Field of the Invention

This invention relates in general to three-wheeled or four-wheeled motorcycles. In particular, this invention relates to three-wheeled or four-wheeled motorcycles having footguards for helping to keep the rider's feet on the pedals.

2. Description of the Prior Art

Three-wheeled and four-wheeled motorcycles have become very popular vehicles, particularly for off-road use. When these vehicles are being used off-road, they are often ridden on uneven ground and subjected to sudden turns. When these motorcycles are ridden on uneven ground, and when they are subjected to sudden turns, they have a tendency to tip over, or at least to lean considerably. If the vehicle tips or leans, the rider has a tendency to want to take his foot off the foot peg and put it out away from the body of the motorcycle for balance.

This tendency to take a foot off the foot peg can be very dangerous on a three-wheeled or four-wheeled motorcycle. If a rider takes his foot off of the peg and puts it out away from the body of the vehicle, it is possible for one of the rear wheels to catch the foot and to drag the rider off of the motorcycle. The two wheels on the rear of the vehicle are located out away from the body of the motorcycle, so an outstretched foot is directly in front of a rear wheel.

A need existed for a footguard, which would help to keep the rider's feet on the pegs and away from the rear wheels. Such a footguard would greatly increase the safety of three-wheeled and four-wheeled motorcycles.

SUMMARY OF THE INVENTION

The general object of this invention is to provide a safer three-wheeled or four-wheeled motorcycle. This invention makes three-wheeled and four-wheeled motorcycles safer by helping to keep the rider's feet on the foot pegs and away from the rear wheels.

The invention includes a footguard, which has a flat, horizontal plate, connected to a frame. The frame is, in turn, attached to the body of the motorcycle.

A vertical member, on the rear edge of the plate, keeps the rider's foot from moving off the plate toward the rear. The vertical member is parallel to the peg except for a portion which curves forward at the inner end of the vertical member.

The footguard may also have an elongated member, which extends rearward and outward from the frame of the motorcycle. This member adds to the safety of the invention by helping to keep the rider's foot away from the rear wheel.

The above, as well as additional objects, features, and advantages of the invention will become apparent in the following detailed description.

DESCRIPTION OF THE PREFERRED EMBODIMENT

Figure 1:
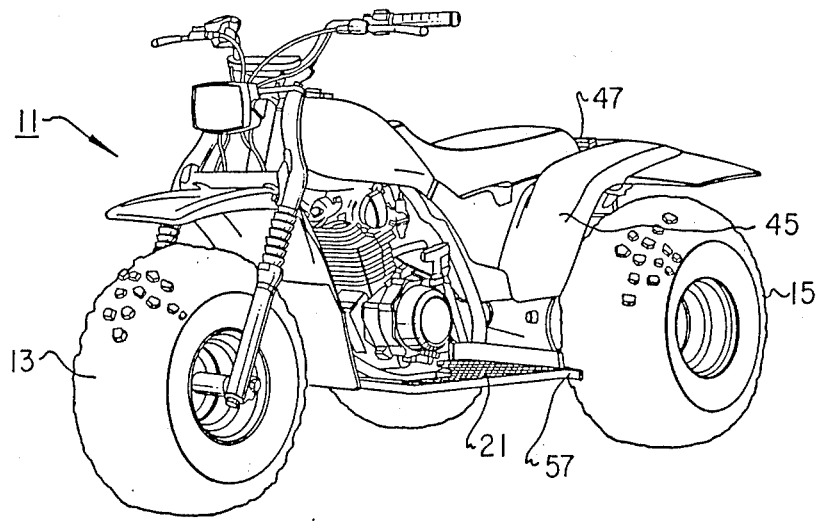
FIG. 1 is a side view of a three-wheeled motorcycle of the invention.

The motorcycle 11 illustrated in FIG. 1 is a three-wheeled vehicle, having a single front wheel 13 and two rear wheels 15. The invention is equally applicable to four-wheeled motorcycles, which have two front wheels and two rear wheels. When a rider is riding the motorocycle 11, the rider normally has one foot placed on each of two foot pegs 17. The two foot pegs 17 extend outward from the body 19 of the motorcycle 11, other either side.

Figure 2:
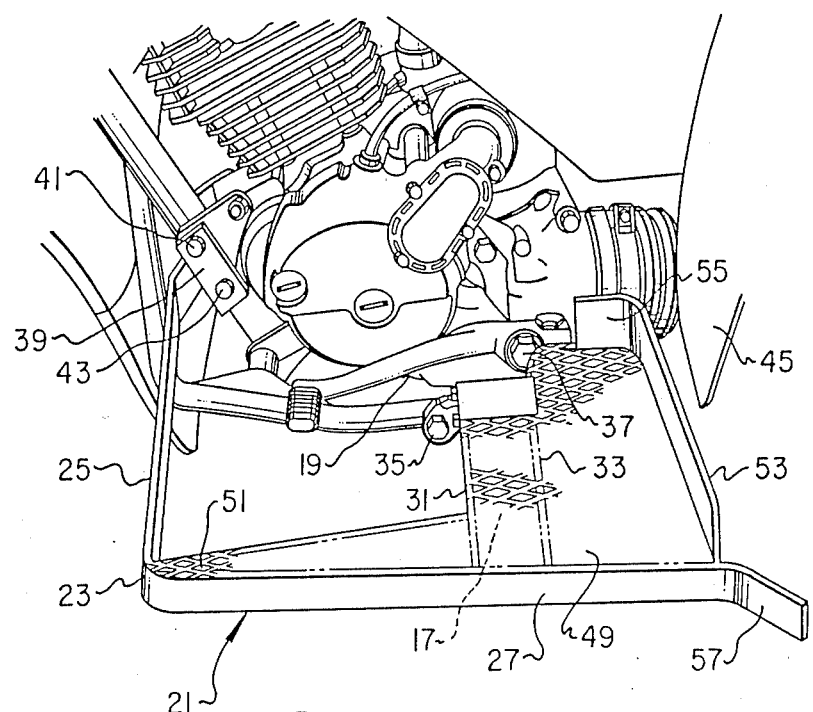
FIG. 2 is a close up view of the footguard of the invention.
Figure 3:
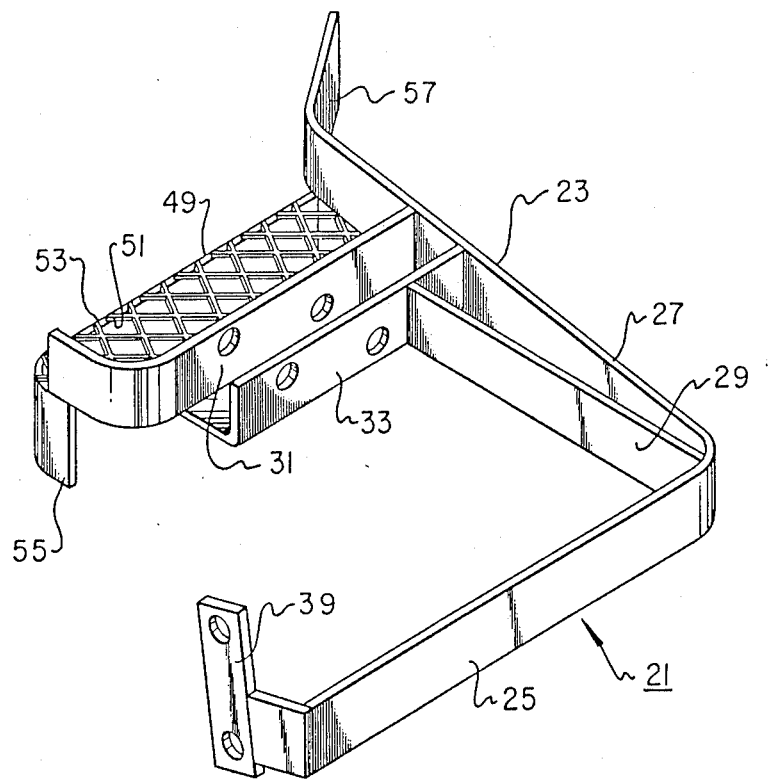
FIG. 3 is an isometric view of the bottom of the footguard of the invention.

FIG. 2 shows a footguard 21 for the left side of the motorcycle 11, and FIG. 3 shows the bottom of a footguard 21 for the right side. The footguard 21 for the right peg is similar, but reversed. The footguard 21 has a metal frame 23. The frame 23 has a front member 25, a side member 27, a bracing member 29, and two channel members 31, 33.

The two channel members 31, 33 attached to the peg 17 by a pair of nut and bolt assemblies 35, 37. The front member 25 of the frame 23 has a flange 39, which is attached to the body 19 of the motorcycle 11 by a pair of nut and bolt assemblies 41, 43. The nut and bolt assemblies 35, 37, 41, 43 are thus an attachment means for attaching the frame 23 to one of the pegs 17 and to the body 19 of the motorcycle 11. There is no direct connection of the frame 23 to the relatively flimsy front or rear feeders 45, 47.

A flat, horizontal plate 49 is attached to the upper side of the frame 23. The frame 23 and the nut and bolt assemblies 35, 37, 41, 43 are thus a connection means for connecting the plate 49 to one of the pedals 17 and to the body 19 of the motorcycle 11. The plate 49 may have a plurality of holes 51, or the plate 49 may have a solid, skid resistant surface. The plate 49 gives the rider's foot a larger support on which to rest.

A vertical member 53 is located on the rear edge of the frame 23, and extends upward from the plate 49. This vertical member 53 prevents the rider's foot from moving off of the plate 49 toward the rear. The vertical member 53 is parallel to the peg 17, except for a portion 55 which curves forward at the inner end of the vertical member 53.

The footguard 21 also has an elongated member guard 57, which extends rearward and outward from the side member 27 of the frame 23. This guard member 57 is approximately for inches long, and extends outward at an angle of about forty-five degrees relative to the side member 27. Since the guard member 57 is an extension of the side member 27, the guard member 57 is lower than the vertical member 53 on the rear of the frame 23. The guard member 57 is thus located slightly ahead of and outward from the rear wheel 15 The guard member 57 thus helps to keep the rider's foot away from the rear wheel 15, if the rider's foot happens to slip off the plate 49.

In operation, the footguard 21 is attached to the foot peg 17 and to the body 19 of the motorcycle 11 with nut and bolt assemblies 35, 37, 41, 43. The rider's foot rests on the plate 49, and the vertical member 53 keeps the rider's foot from moving off of the plate 49 to the rear. This helps to prevent the rider's foot from catching in the rear wheel 15 and dragging the rider off of the motorcycle 11. The guard member 57 also helps to keep the rider's foot away from the rear wheel 15.

The invention has been shown in only one of its forms. It should be apparent to those skilled in the art that it is not so limited, but is susceptible to various changes and modifications without departing from the spirit thereof.

I claim:

1. A motorcycle, having a body, two rear wheels, two rear fenders, a peg on each side of the body for a rider's feet, and a footguard on each peg, each footguard comprising:
   a frame, spaced forward of the rear fender, the frame having a front member, a side member, and a pair of channel members;
   a flange on the inner end of the front member;
   a flat horizontal plate, attached to the frame, the plate extending over and rearward from the channels and having a forward edge located rearward of the front member, defining an aperture between the front member and plate to enable control of the motorcycle by the rider's foot;
   attachment means for attaching the channels members to one of the pegs and the flange to the body of the motorcycle;
   a vertical member, extending upward from the rear edge of the plate, the vertical member having a portion extending from the inner edge to this outer edge of the plate and being substantially parallel to the peg, the vertical member being spaced from the lower edge of the rear fender; and
   an elongated guard member, which extends rearward and outward from the side member of the frame, to prevent entry of the rider's foot into the wheel area.

2. A motorcycle, as recited in claim 1, wherein the plate has a plurality of holes.

3. A motorcycle, as recited in claim 1, wherein the elongated guard member is located lower than the plate.

4. A motorcycle, having a body, two rear wheels, two rear fenders, a peg on each side of the body for a rider's feet, and a footguard on each pedal, each footguard comprising:
   a frame, spaced forward of the rear fender, the frame having a front member, a side member, and a pair of channel members;
   a flange on the inner end of the front member;
   a flat horizontal plate, attached to the upper side of the frame, the plate extending both forward and rearward of the peg;
   attachment means for attaching the channel members to one of the pegs and the flange to the body of the motorcycle;
   a vertical member, extending upward from the rear edge of the plate, the vertical member being parallel to the peg except for a portion which curves forward at the inner end of the vertical member; and
   an elongated guard member, which extends rearward and outward from the side member of the frame, and which is located lower than the plate.

* * * * *